3,156,290
FLUID-HANDLING SYSTEM FOR OIL BURNERS
Kenneth C. Goodall, Jr., 1440 SW. Hood View Lane, Lake Oswego, Oreg., and Kenneth C. Bradford, 5723 NE. Simpson, Portland 18, Oreg.
Filed Aug. 16, 1962, Ser. No. 217,383
2 Claims. (Cl. 158—36.3)

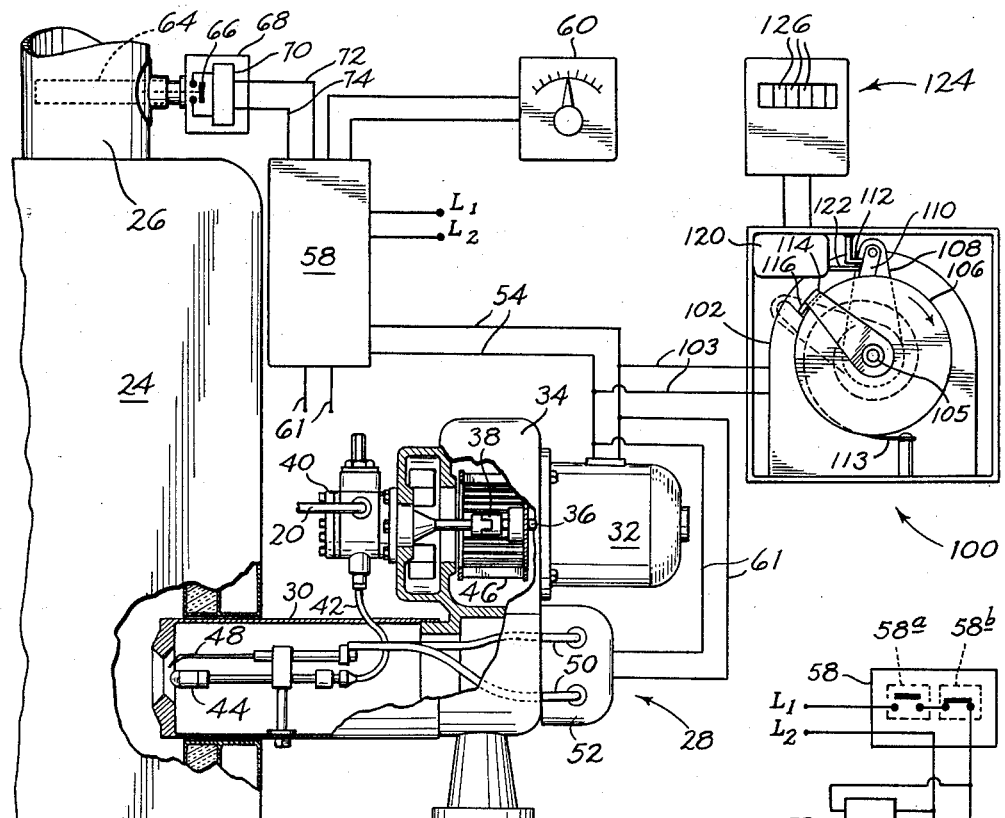
Fig. 2.
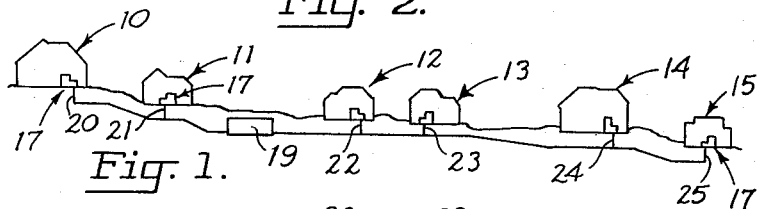
Fig. 1.
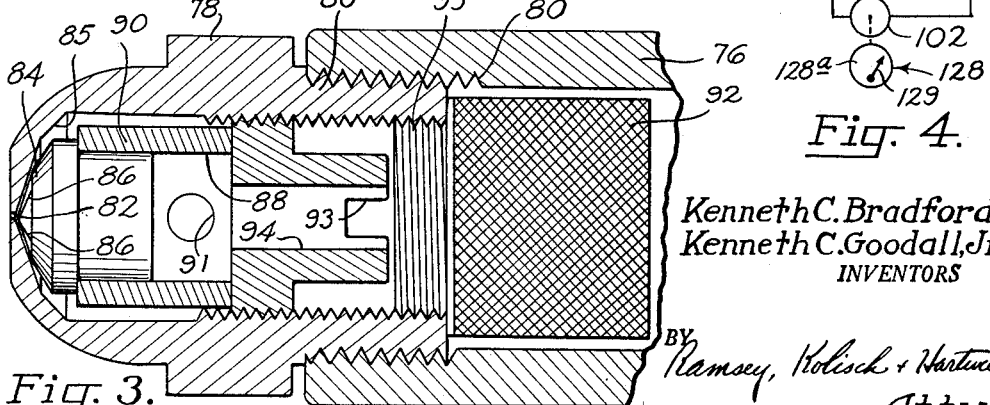
Fig. 3.
Fig. 4.
Kenneth C. Bradford
Kenneth C. Goodall, Jr.
INVENTORS United States Patent Office 3,156,290
Patented Nov. 10, 1964

This invention relates to fluid-handling systems, and more particularly to such systems including means for recording the quantity of fluid flowing therethrough. As contemplated herein, a specific form of the invention relates to a heating system, for homes or establishments, including means for recording fuel consumption. The invention, therefore, concerns novel features in fluid-handling systems in general, as well as heating systems with novel means for determining and recording the amount of fuel used.

One of the general objects of the invention is to provide novel means for determining and recording amounts of liquid flow, which is accurate, relatively simple, easy to install, and easy to maintain in operating condition.

Another general object is to provide such a means, which is susceptible of adjustment to accommodate differences in operating conditions.

An object related to the above is to provide a unit for making fluid flow determinations, which may be manufactured at considerable lower cost than comparable devices.

While the invention is discussed hereinbelow in connection with a heating system, it should be apparent that certain features, objects and advantages have general application. Thus, the description that follows is intended for illustrative purposes, and it is desired to limit the invention only by the scope of the claims included herein.

In the past, a typical type of oil heating system has included a tank for holding fuel oil, and a motor-driven oil-burner unit which is supplied fuel oil from the tank. The amount of fuel oil used was determined periodically, at the time of refilling the tank, with a customer paying the supplier for the amount of fuel oil needed to fill the tank. With such a system, a meter or other device for recording fuel consumption is unnecessary.

This invention contemplates a system wherein a common reservoir or tank is provided for supplying fuel oil to the burner units of several different houses or establishments. Supply conduits or lines connect the common tank with the various oil-burner units. Since there are several houses withdrawing oil from the same source, oil consumption cannot be determined by the amount of oil needed to replenish the tank. Thus, means is provided for each burner unit to record the oil consumed therein. The system has the advantage of providing a more continuous service for the customer, and more regular billing, since the customer may be billed periodically for the actual amount of fuel used during the period.

According to this invention, the amount of fuel that a burner unit uses is determined by recording the length of time that fuel flow through the burner at a constant or uniform rate takes place. Thus, the burner unit may be provided with a constant capacity nozzle, i.e., one through which liquid at a given constant pressure will flow at a uniform rate. A positive displacement pump is provided in the oil-burner unit, and this positive displacement pump is driven by a substantially constant speed motor, such as a conventional substantially constant speed A.C. motor. With this organization, a uniform rate of flow of fuel through the oil-burner unit occurs. A timing device, including a timer motor and a recorder operatively connected to the timer motor so as to record the total time of its operation, is also provided, with the timer motor interconnected with the motor of the oil-burner unit so that the two motors operate concurrently. With the construction, the amount of fuel oil consumed over a given period is readily determined, by noting the reading of the recorder, which may be translated into gallons of fuel used.

In one modification of the invention, the timing device includes a device for producing output pulses at a set frequency, and means is provided for counting and recording said output pulses. The device for producing the output pulses is operated only during those periods that the motor of the oil burner is operated, and by noting the number of pulses emitted by the device, a calculation of fuel oil consumtion may be made. It is contemplated that the frequency of the pulses produced by the device may be adjusted, so that a reading in the recording means may be exactly correlated to the oil flow in any given oil-burner unit. Thus, the construction contemplated is readily adapted for installation with a wide variety of heating systems.

A more specific object of the invention, therefore, is to provide, in a fluid-handling system, means for producing periods of flow through a conduit therein, with such flow occurring at a uniform rate, and means for recording the total time elapsing during flow periods, such means including a timer motor and a recorder driven by the timer motor.

Another object is to provide a fluid-handling system, that includes a motor-driven pump operated intermittently, to produce intermittent periods of flow, and means operatively connected to the motor driving the pump, operable to indicate total operating time of the motor, which time may be translated into total volume of flow.

Yet another object is to provide a fluid-handling system that includes a conduit, and a motor-driven pump for producing periods of flow therethrough, and in combination with this organization a device producing output pulses at a set frequency, and means connected to this device for counting and recording the pulses, the device producing output pulses operating only when the motor-driven pump is operating.

Yet another object of the invention is to provide an improved type of oil heating system, for a house or other establishment, comprising an oil-burner unit, including a motor and a pump, means controlling said unit, such as a thermostat, producing intermittent operating periods, and means determining fuel consumption comprising a timer motor with operating periods coinciding with the operating periods of the motor of the oil-burner unit. The device operates coincidently with the burner motor and pump, not with the production of a flame in the furnace, since the latter does not always coincide with fuel consumption.

A related object is to provide such a construction where the timer motor drives a device for producing output pulses at a set frequency, and the latter device is connected to means recording the output pulses.

These and other objects and advantages are attained by the invention, and the same is described hereinbelow in conjunction with the accompanying drawings, wherein:

FIG. 1 is a simplified drawing, illustrating a housing area, with a multiplicity of houses therein, and each of the houses including a heating system with an oil-burner unit, such units being supplied with fuel from a common tank or reservoir;

FIG. 2 is a view, partly diagrammatic, illustrating a heating system such as might be provided in one of the houses in FIG. 1, such heating system including an oil-burner unit where the fuel consumption of the unit is recorded by the means contemplated by this invention;

FIG. 3 is a view, on an enlarged scale, illustrating a nozzle of the type that may be employed in the oil-burner unit; and FIG. 4 is a diagrammatic view, illustrating a modification of the invention.

Referring now to the drawings, and more particularly FIG. 1, here there is illustrated a housing area including a multiplicity of houses indicated generally at 10–15. Each of these houses is provided with a heating system, including a furnace and an oil-burner unit, indicated generally at 17. A tank or reservoir 19 holds a quantity of fuel oil, which is supplied to the heating systems of the various houses through supply conduits or lines 20–25.

Referring now to FIG. 2, where a heating system as contemplated by this invention is illustrated in more detail, the system shown comprises a furnace 24, connecting with a stack 26. To one side of furnace 24 is a gun-type oil-burner unit 28, including a blast tube 30 extending into the furnace through one side thereof.

Burner unit 28 comprises an electric motor 32, more specifically a substantially constant-speed, usually A.-C.-type motor, which is suitably secured through its housing to housing 34 of the burner unit. The motor is connected through its output shaft 36 and a coupling 38 to a positive displacement pump 40. Such may be a conventional, gear-type pump, including a pair of meshing gears which collect oil between the teeth thereof and force such oil to the outlet of the pump, as illustrated diagrammatically in FIG. 4. Supply line 20 for the pump connects with the input side of the pump. A conduit 42 connected to the output side of the pump terminates in a nozzle for the burner unit, indicated at 44.

Continuing the description of the oil-burner unit, a blower is indicated at 46 which forces air through blast tube 30 into the furnace. Fuel, i.e., oil, ejected into the furnace through nozzle 44 is ignited to produce a flame by means of electrode means 48. The electrode means is connected by leads 50 to an ignition transformer 52 mounted on housing 34.

Motor 32 is supplied electrical current by conductors 54 which are connected through the switch of a suitable motor relay within relay box 58 (switch 58a in FIG. 4) with supply conductors $L_1$, $L_2$. Operating periods of the motor, and thus the pump driven by the motor, are controlled by a thermostat 60, which usually is in some room of the house and is also referred to as a room thermostat. The thermostat is conventional, and includes suitable switch means operated by a thermosensitive element, which, when the switch means is actuated, actuates the motor relay switch within relay box 58 to complete a circuit between supply conductors $L_1$, $L_2$ and conductors 54.

Electrode means 48 is supplied current to produce a starting spark at the same time that motor 32 is started. Thus, when the switch means of thermostat 60 is actuated, the motor relay in the relay box controlled by thermostat 60 also completes a circuit to transformer 52, with current flowing through conductors 61.

Some types of oil-burner units utilize an electrode means that produces a firing spark during the entire time that the burner unit is operating. In other types, the electrode means supplies a spark for a short period during the start of operation only, with the fuel self igniting after this start-up period. For the purpose of this disclosure, a burner unit of the former type has been described.

Occasionally, because of some malfunctioning, it may happen that the motor and pump of the oil-burner unit will discharge oil into the furnace, without such oil burning. If this proceeds for too long a time, fuel oil collects at the base of the furnace to produce a hazardous condition. Thus, a safety control is included, responsive to stack temperature (constituting a furnace temperature responsive means), which is operable to turn off the motor and pump of the unit, should the stack temperature not rise properly after a short period of motor operation.

More specifically, at 64 there is indicated generally a thermosensitive device within stack 26 for actuating a normally open switch, indicated diagrammatically at 66, within control box 68. Also mounted within box 68, and indicated diagrammatically, is a time delay switch mechanism 70. Mechanism 70 is conventional, and includes a normally closed switch that opens after a predetermined time delay. Switch 66 and time delay switch mechanism 70 are connected by conductors 72, 74, to a relay in box 58 including a switch (switch 58b in FIG. 4) in the supply circuit for motor 32. With a closed circuit existing between conductors 72, 74, relay switch 58b is closed, and operation of motor 32 is controlled by thermostat 60.

Explaining the operation of the safety control, when thermostat 60 is first actuated to cause starting of motor 32, switch 66 is open and the switch of delay mechanism 70 is closed, producing the required close circuit between conductors 72, 74. After the expiration of a predetermined period of time, for example, one minute, the switch of delay mechanism 70 opens. If the fuel ejected from the nozzle of the oil-burner unit has been burning, the heat produced therefrom causes switch 66 to close before the switch of mechanism 70 opens, which results in continued operation of motor 32 when the time delay mechanism switch opens. In the event that such fuel has not been burning, however, switch 66 remains open, and on opening of the switch of the time delay mechanism, an open circuit results between conductors 72, 74, which operates to stop motor 32.

Referring to FIG. 3, here a constant capacity nozzle is illustrated, which ejects fuel at a substantially constant rate when such fuel is fed to the nozzle at a substantially constant pressure by pump 40. As shown in FIG. 3, at 76 is indicated an adaptor, through which the nozzle is secured in place. Nozzle part 78 is screwed into the adaptor, through externally threaded stem portion 80. Extending through the nozzle part is an orifice 82, through which fuel under pressure is ejected. A distributor 84, including a head 85 with slots 86 provided in the surface thereof, is fitted within a chamber 85 provided inside the nozzle part. The right end of the distributor comprises a band 90 mounted, fastened onto head 85 and inside the band is a cavity 88. Extending through the band, and placing cavity 88 in communication with chamber 85, are bores 91 on diametrically opposite sides of the band. A screw pin 93, with a passage 94 through the center thereof, is screwed into place inside the nozzle part, with the left end thereof abutting band 90 of the distributor. A hollow strainer, indicated at 92, is also screwed into nozzle part 78, through an externally threaded stem portion 93 joined to one end of the strainer.

Fuel on leaving line 42 passes through the adaptor and thence through the sides of the strainer into the hollow interior of the strainer. Fuel then flows out the left end of the strainer, which is open, and through passage 94 in the center of pin 93, into cavity 88. From cavity 88, fuel flows out through bores 91 into chamber 85, and to orifice 82 through slots 86 in the head of the distributor. The various elements described restrict the flow of fuel, and produce a substantially constant rate of flow, for a given pump pressure.

As contemplated by this invention, fuel consumption of the burner unit is determined by a timing device, including a timer motor, that is operated only during those periods that motor 32 of the burner unit operates. Connected to the timer motor is a recorder operable to record the total operating time of the timer motor, which may be translated into gallons of fuel used, knowing the flow rate of fuel through the unit.

Describing now the timing device and related structure, and considering first of all the modification of the invention illustrated in FIG. 2, here the timing device is indicated generally at 100, such including a substantially constant speed timer motor 102. Timer motor 102 is connected by conductors 103 to the conductors supplying motor 32 of the burner unit, and thus is electrically in parallel with the burner motor, so that it runs conjointly with motor 32.

Motor 102 drives a device for producing pulses at a predetermined frequency, now to be described. Specifically, motor 102 is connected through suitable reduction gearing (not shown) to a shaft 105, which has a clutch disc 106 mounted thereon. Disc 106 is rotated by the motor in a clockwise direction in FIG. 2, or in the direction indicated by the arrow. Journaled on shaft 105, to the rear of disc 106 in FIG. 2, is an arm 108, having a clutch finger 110 pivoted on the end thereof. When the end of finger 110 firmly engages the periphery of disc 106, and the disc is rotated in the direction shown, the finger causes the disc to carry with it arm 108. A pin 112 establishes the start position for arm 108. Spring 113 is connected to arm 108 and is a return spring.

A release arm for releasing finger 110 from firm engagement with the outside of disc 106 is shown at 114. The arm normally is stationary, but may be manually adjusted, by rotating it about an axis corresponding to the center of shaft 105, to various positions. At the end of the release arm is a pin 116, that overlies the periphery of disc 106. When arm 108 moves finger 110 against pin 116, the pin moves the finger out of contact with the disc, thus to release the finger and disc.

Explaining how the disc, finger, and release arm operate, and assuming that the parts are in the position shown in solid outline in FIG. 2, upon energizing of motor 102, arm 108 is carried, in a clockwise direction, by the disc. When arm 108 reaches the position shown in dashed outline, pin 116 releases arm 108 from movement with the disc by tripping finger 110. This enables spring 113 quickly to swing the arm back to its original starting position where pin 112 on engaging finger 110 moves the finger into firm engagement with the disc. On further movement of the disc, the arm is again drawn clockwise with the disc, with recurrent release, as described.

At 120 there is indicated a switch, having an actuating finger 122 engaged by finger 110 when arm 108 is in its starting position. Switch 120 is connected to an electrically powered digital counter 124 of conventional design, having the usual dials 126 with digits marked thereon. Switch 120, when it is actuated, produces output pulses actuating counter 104, with the dials of the counter, when actuated by a series of pulses, moving so as to record the sum of the pulses that it receives. Thus, the counter constitutes a recorder recording the pulses it receives.

From this it will be seen that one pulse is transmitted to the counter each time arm 108 returns to its starting position. Assuming continuous operation of motor 102 and rotation of disc 106, the frequency at which output pulses are delivered to the counter is determined by the position of arm 114. With arm 114 set in a position diametrically across from the position shown, for instance, the movement required of arm 108 for it to travel to a release position is considerably less, and the frequency at which pulses are delivered to the counter is correspondingly increased.

Explaining the apparatus described above, it will be assumed that the burner unit consumes fuel at the rate of one gallon an hour, when it is operating. With such a unit, arm 114 may be adjusted so that it takes exactly one hour for arm 108 to move from its starting position to its release position and then snap back to its starting position. If the total operating time of the burner unit in a day's period is five hours, during this period a total of five pulses will have been produced by switch 120, causing the counter to be actuated five times. With each pulse producing an increase of one in the numerical reading of the counter, the gallons of fuel consumed may be read directly from the recorder.

The adjustability of the device for producing pulses, whereby the frequency of the pulses may be changed, is particularly advantageous when installing the system contemplated with burner units of various types of construction. Thus, while it has been assumed that the burner unit consumed one gallon of fuel an hour, different burner units may burn fuel at different rates. Variations in burning rates may be taken care of when installing the system by setting arm 114 so that the frequency of the output pulses corresponds properly to the rate of oil consumption.

Specific constructions have been described herein, but of course variations are possible. For instance, instead of the mechanical type of clutch described, in connection with the device producing output pulses, an electrically actuated clutch may be employed which is engaged to start movement of the movable arm, and disengaged upon the arm completing its movement. Further, the counter or recorder could register digits which have other than a 1:1 relationship to fuel consumption in gallons.

Referring now to FIG. 4, here there is illustrated, in diagrammatic form, a modification of the invention. As in the case of the first embodiment illustrated, conductors $L_1$, $L_2$ are provided which are connected to a burner motor 32, so that upon closing of switch 58a actuated by thermostat 60 the motor is actuated. Also, as in the first embodiment, a safety device including a switch 58b is provided which is responsive to temperatures in stack 26. Connected in parallel with the burner motor, is a timer motor, indicated again at 102.

In this modification of the invention, the recorder is connected directly to the timer motor, and runs continuously conjointly with the timer motor. The recorder, indicated at 128, may comprise a regular dial face 128a, resembling a clock face, and includes one or more hands over the front face thereof connected mechanically to the timer motor so as to be turned by operation of the motor. The position of the hand or hands 129 on the dial face is indicative of fuel consumption.

While embodiments of this invention have been described it should be obvious that changes may be made, in the construction and/or organization, without departing from the invention. It is desired not to be limited to the specific embodiments herein disclosed, but to cover all modifications and variations that would be apparent to one skilled in the art, and that come within the scope of the appended claims.

It is claimed and desired to secure by Letters Patent:

1. An oil burner system comprising an oil reservoir, an oil burner unit including an intermittently operated motor-driven pump for pumping oil and a nozzle restricting the flow of oil pumped by said pump, said pump in said unit producing a substantially constant rate of flow of oil through said nozzle, a supply conduit connecting said oil burner unit and said reservoir, a timing device, said timing device including a constant speed timer motor driving the device and pulse generating means driven by said timer motor producing pulses at a regular frequency, said pulse generating means being adjustable to change the frequency at which pulses are produced, means interconnecting the timer motor of said device and the motor of the motor-driven pump whereby one operates only when the other operates, and counter means for counting and recording pulses operatively connected to the pulse generating device and receiving the pulses therefrom, adjustment of said pulse generating means enabling a change to be made in the count recorded by said counter means over a given time period whereby the counter means may be set to record pulses exactly corresponding in number to volume units of oil pumped.

2. An oil burner system comprising an oil reservoir, a multiplicity of oil burner units, a supply conduit for each unit connected to the reservoir whereby the unit receives oil from the reservoir, each of said oil burner units including a pump for pumping oil through its supply conduit, an electric motor for driving the pump, and a nozzle restricting the flow of oil through its supply conduit, a control device for each oil burner unit operating the unit intermittently with intermittent periods of oil flow resulting, an electric timer motor for each oil burner unit, electrical supply means supplying power to and interconnecting the timer motor and the motor for driving the pump whereby the timer motor operates only during periods coinciding with periods of oil flow produced by the pump, adjustable pulse generating means connected to and driven by the timer motor for producing output pulses at a regular frequency and adjustable to change the frequency at which pulses are produced, and counter means for counting and recording pulses operatively connected to said pulse generating means so as to receive pulses therefrom and count and record these pulses.

References Cited in the file of this patent

UNITED STATES PATENTS

| | | |
|---|---|---|
| 268,733 | Schmidt | Dec. 5, 1882 |
| 2,917,149 | Poirier | Dec. 15, 1959 |

FOREIGN PATENTS

| | | |
|---|---|---|
| 869,435 | Great Britain | May 31, 1961 |
| 1,119,190 | France | Apr. 3, 1956 |